United States Patent
Arellano et al.

(10) Patent No.: US 9,244,679 B1
(45) Date of Patent: Jan. 26, 2016

(54) SYSTEMS AND METHODS FOR AUTOMATICALLY IDENTIFYING CHANGES IN DELIVERABLE FILES

(71) Applicant: Symantec Corporation, Mountain View, CA (US)

(72) Inventors: Alejandro Arellano, Oviedo, FL (US); Bryan Laird, Longwood, FL (US); Check Sabjan, Sanford, FL (US)

(73) Assignee: Symantec Corporation, Mountain View, CA (US)

( * ) Notice: Subject to any disclaimer, the term of this patent is extended or adjusted under 35 U.S.C. 154(b) by 47 days.

(21) Appl. No.: 14/025,796

(22) Filed: Sep. 12, 2013

(51) Int. Cl.
G06F 9/44 (2006.01)
G06F 9/445 (2006.01)

(52) U.S. Cl.
CPC .. G06F 8/71 (2013.01); G06F 8/65 (2013.01); G06F 8/70 (2013.01)

(58) Field of Classification Search
CPC ................ G06F 8/71; G06F 8/70; G06F 8/65
See application file for complete search history.

(56) References Cited

U.S. PATENT DOCUMENTS

| | | | | | |
|---|---|---|---|---|---|
| 5,649,200 | A * | 7/1997 | Leblang | ................... | G06F 8/71 707/999.202 |
| 5,854,932 | A * | 12/1998 | Mariani | ................... | G06F 8/71 717/116 |
| 7,127,712 | B1 * | 10/2006 | Noble | ...................... | G06F 8/65 717/168 |
| 7,143,366 | B1 * | 11/2006 | McKelvey et al. | ............ | 715/234 |
| 7,392,471 | B1 * | 6/2008 | Ford et al. | ..................... | 715/234 |
| 7,539,976 | B1 * | 5/2009 | Ousterhout | ............... | G06F 8/71 717/120 |
| 7,640,533 | B1 * | 12/2009 | Lottero | ..................... | G06F 8/71 717/108 |
| 7,676,788 | B1 * | 3/2010 | Ousterhout | ............... | G06F 8/71 709/226 |
| 8,495,586 | B2 * | 7/2013 | Zeidman | ....................... | 717/128 |
| 2004/0153994 | A1 * | 8/2004 | Bates | ........................ | G06F 8/70 717/110 |
| 2006/0282479 | A1 * | 12/2006 | Johnson | ..................... | G06F 8/65 |
| 2006/0282480 | A1 * | 12/2006 | Johnson | ..................... | G06F 8/71 |
| 2007/0050762 | A1 * | 3/2007 | Chen | ......................... | G06F 8/71 717/169 |
| 2007/0168955 | A1 * | 7/2007 | Nicol | ........................ | G06F 8/71 717/120 |
| 2007/0277167 | A1 * | 11/2007 | Smith | ....................... | G06F 8/65 717/168 |

(Continued)

OTHER PUBLICATIONS

Colin Percival, An Automated Binary Security Update System for FreeBSD, [Online] 2003, Proceedings of BSDCon '03 Sep. 8-12, 2003, [Retrieved from the Internet] <https://www.usenix.org/legacy/events/bsdcon2003/tech/full_papers/percival/percival_html/> 9 pages total.*

(Continued)

*Primary Examiner* — Thuy Dao
*Assistant Examiner* — Ravi K Sinha
(74) *Attorney, Agent, or Firm* — ALG Intellectual Property, LLC

(57) ABSTRACT

A computer-implemented method for automatically identifying changes in deliverable files may include (1) identifying, within first and second versions of a program file, at least one post-file-header section that is located after a file header of the program file, (2) locating, within the post-file-header section of the first version of the program file, a first set of characters that correspond to at least one data field that is known to potentially change between builds of the program file even when source code of the program file has not changed, (3) locating, within the post-file-header section of the second version of the program file, a second set of characters that correspond to the data field, and (4) masking both the first and second sets of characters from a comparison between the first and second versions of the file. Various other methods, systems, and computer-readable media are also disclosed.

20 Claims, 8 Drawing Sheets

(56) References Cited

U.S. PATENT DOCUMENTS

| | | | |
|---|---|---|---|
| 2008/0196008 A1* | 8/2008 | Branton et al. | 717/120 |
| 2008/0244522 A1* | 10/2008 | Bernin | G06F 8/71 717/122 |
| 2010/0050156 A1* | 2/2010 | Bonanno | G06F 8/71 717/122 |
| 2010/0077387 A1* | 3/2010 | Callaghan | G06F 8/68 717/140 |
| 2010/0138454 A1* | 6/2010 | Volkmer | G06F 8/71 707/803 |
| 2010/0191690 A1* | 7/2010 | Bitonti | G06F 8/71 706/47 |
| 2010/0262948 A1* | 10/2010 | Melski | G06F 8/71 717/101 |
| 2012/0079456 A1* | 3/2012 | Kannan | G06F 8/71 717/124 |
| 2013/0067427 A1* | 3/2013 | Fox | G06F 8/70 717/101 |
| 2013/0111440 A1* | 5/2013 | Forster | G06F 8/70 717/121 |
| 2013/0174124 A1* | 7/2013 | Watters | G06F 8/71 717/122 |
| 2014/0282459 A1* | 9/2014 | Hey | G06F 8/65 717/168 |
| 2015/0248280 A1* | 9/2015 | Pillay | G06F 8/70 717/106 |

OTHER PUBLICATIONS

Adarsh Thampan and Suchitra Venugopal, Debugging formats DWARF and STAB, [Online] Jul. 25, 2011, IBM developerWorks, [Retrieved from the Interent] <http://www.ibm.com/developerworks/library/os-debugging/os-debugging-pdf.pdf> 14 pages.*

Fluri, B.; Wursch, M.; Pinzger, M.; Gall, H.C., Change Distilling:Tree Differencing for Fine-Grained Source Code Change Extraction, [Online] 2007, in Software Engineering, IEEE Transactions on , vol. 33, No. 11, Nov. 2007 [Retrieved from the Internet] <http://ieeexplore.ieee.org/stamp/stamp.jsp?tp=&arnumber=4339230&isnumber=4339227> pp. 725-743.*

Eelco Dolstra, Efficient upgrading in a purely functional component deployment model., [Online] 2005, Component-Based Software Engineering. Springer Berlin Heidelberg, 2005, [Retrieved from the Internet] <http://link.springer.com/chapter/10.1007/11424529_15> pp. 219-234.*

Colin Percival, Naive differences of executable code, [Online] 2003, [Retrieved from the Internet] <http://www.facweb.iitkgp.ernet.in/~pallab/mob_com/bsdiff.pdf> 3 pages.*

Zynamics; Zynamics BinDiff 3.0 Manual; Zynamics GmbH.; as made aware of on Jun. 19, 2013.

* cited by examiner

SYSTEMS AND METHODS FOR AUTOMATICALLY IDENTIFYING CHANGES IN DELIVERABLE FILES

BACKGROUND

In software development, some files may changes between builds, while other files may not change. When preparing a patch or update, developers may only include those files in the patch that have changed between builds. Unfortunately, there is no conventional system for automatically identifying files that have changed between builds. Instead, developers may manually inspect different files by hand to determine whether a particular file should be included in a patch. If the developers make an incorrect list of files to be included in the patch, then the mistake could result in significant delays.

Attempts to automate the process of comparing files and listing deliverable files have generally failed. Developers have attempted to create databases of source files and the files that derive from the source files. But the databases may be difficult to generate and may not practically or easily handle common header files. Developers have also attempted to compare hashes of each section in portable executable files. But the relocation tables of the portable executable files showed differences even when the source code had not changed.

Accordingly, the instant disclosure identifies and addresses a need for additional and improved systems and methods for automatically identifying changes in deliverable files.

SUMMARY

As will be described in greater detail below, the instant disclosure generally relates to systems and methods for automatically identifying changes in deliverable files by identifying data fields that may change even when program source code has not changed, and then masking those data fields from a comparison of two versions of a file. If the comparison shows that the two versions of the file are different, despite the masking, then the source code may have changed and the systems and methods may determine, based on the comparison, to include the later version of the file in a patch.

In one example, a computer-implemented method for automatically identifying changes in deliverable files may include (1) identifying, within first and second versions of a program file, at least one post-file-header section that is located after a file header of the program file, (2) locating, within the post-file-header section of the first version of the program file, a first set of characters that correspond to at least one data field that is known to potentially change between builds of the program file even when source code of the program file has not changed, (3) locating, within the post-file-header section of the second version of the program file, a second set of characters that correspond to the data field that is known to potentially change between builds of the program file, and (4) masking both the first and second sets of characters from a comparison between the first and second versions of the file by excluding the characters from consideration during the comparison.

In one embodiment, the data field may include at least one of: (1) a source file name that indicates a name of a source file corresponding to the program file, (2) a decorated name that was decorated to distinguish an entity that an undecorated version of the decorated name identifies from other entities having the same undecorated name, (3) a random number designating an anonymous namespace that limits applicability of the namespace to the program file, (4) a globally unique identifier, (5) a random number in a precompiled header name that identifies a precompiled header file that is compiled into intermediate form to increase compiling efficiency, and/or (6) a value within a symbol table that associates at least one identifier in the source code with metadata about the identifier.

In one embodiment, the data field designates a first build number in the first version of the program file and a later build number in the second version of the program file. In one example, the computer-implemented method may further include, prior to masking both the first and second sets of characters, verifying that the first set of characters is located within the first version of the program file at a same offset as the second set of characters is located within the second version of the program file.

In one embodiment, the first version of the program file may contain, in the post-file-header section, a subsequent instance of the first build number. The second version of the program file may contain, in the post-file-header section, a subsequent instance of the later build number. The subsequent instance of the first build number may be located at an offset in the first version that is different than an offset where the subsequent instance of the later build number is located in the second version. Excluding the first set of characters and the second set of characters may include shifting the subsequent instance of the first build number and the subsequent instance of the later build number so that the subsequent instance of the first build number and the subsequent instance of the later build number are located at a same offset.

In some examples, the computer-implemented method may further include displaying both the first version of the program file and the second version of the program file adjacent to each other in a graphical user interface. In one embodiment, the computer-implemented method may further include determining, based on the comparison between the first version of the program file and the second version of the program file, whether to include the second version of the program file in a patch.

In one embodiment, the computer-implemented method may further include (1) searching a directory that contains the first version of the program file and another directory that contains the second version of the program file for all pairs of object files in the directory and the other directory, where each pair contains a first version of the object file and a second build version of the object file and (2) for each pair of object files in the directory and the other directory, determining whether to include the second version of the object file in the patch. In some examples, determining whether to include the second version of the program file in the patch may include: (1) identifying at least one of an executable file and a dynamic link library file that contains the program file and/or (2) including the at least one of the executable file and the dynamic link library file in the patch.

In one embodiment, the computer-implemented method may further include (1) prior to masking both the first and second sets of characters, performing a binary comparison between data within the post-file-header section of the first version of the program file and data within the post-file-header section of the second version of the program file, and (2) determining, based on the binary comparison, that the data within the post-file-header section differs between the first build and the later build.

In one embodiment, a system for implementing the above-described method may include (1) an identification module that identifies, within first and second versions of a program file, at least one post-file-header section that is located after a file header of the program file, (2) a location module that locates, within the post-file-header section of the first version of the program file, a first set of characters that correspond to at least one data field that is known to potentially change between builds of the program file even when source code of the program file has not changed and that locates, within the post-file-header section of the second version of the program file, a second set of characters that correspond to the data field that is known to potentially change between builds of the program file, (3) a masking module that masks both the first and second sets of characters from a comparison between the first and second versions of the file by excluding the characters from consideration during the comparison, and (4) at least one processor configured to execute the identification module, the location module, and the masking module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify, within first and second versions of a program file, at least one post-file-header section that is located after a file header of the program file, (2) locate, within the post-file-header section of the first version of the program file, a first set of characters that correspond to at least one data field that is known to potentially change between builds of the program file even when source code of the program file has not changed, (3) locate, within the post-file-header section of the second version of the program file, a second set of characters that correspond to the data field that is known to potentially change between builds of the program file, and (4) mask both the first and second sets of characters from a comparison between the first and second versions of the file by excluding the characters from consideration during the comparison.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
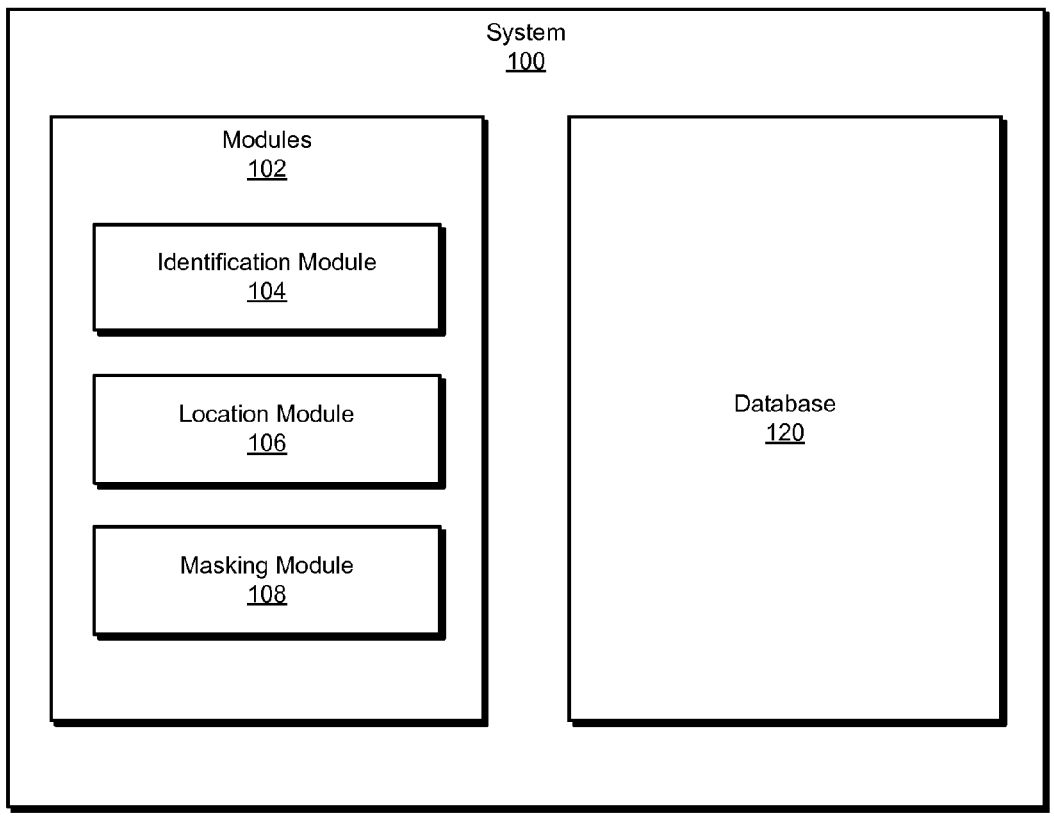
FIG. 1 is a block diagram of an exemplary system for automatically identifying changes in deliverable files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for automatically identifying changes in deliverable files. As will be explained in greater detail below, the systems and methods described herein may enable developers to quickly and automatically compare different versions of files to identify updated files for inclusion in a patch. The systems and methods may perform the comparison by masking data fields that are known to change even when underlying source code has not changed.

Figure 2:
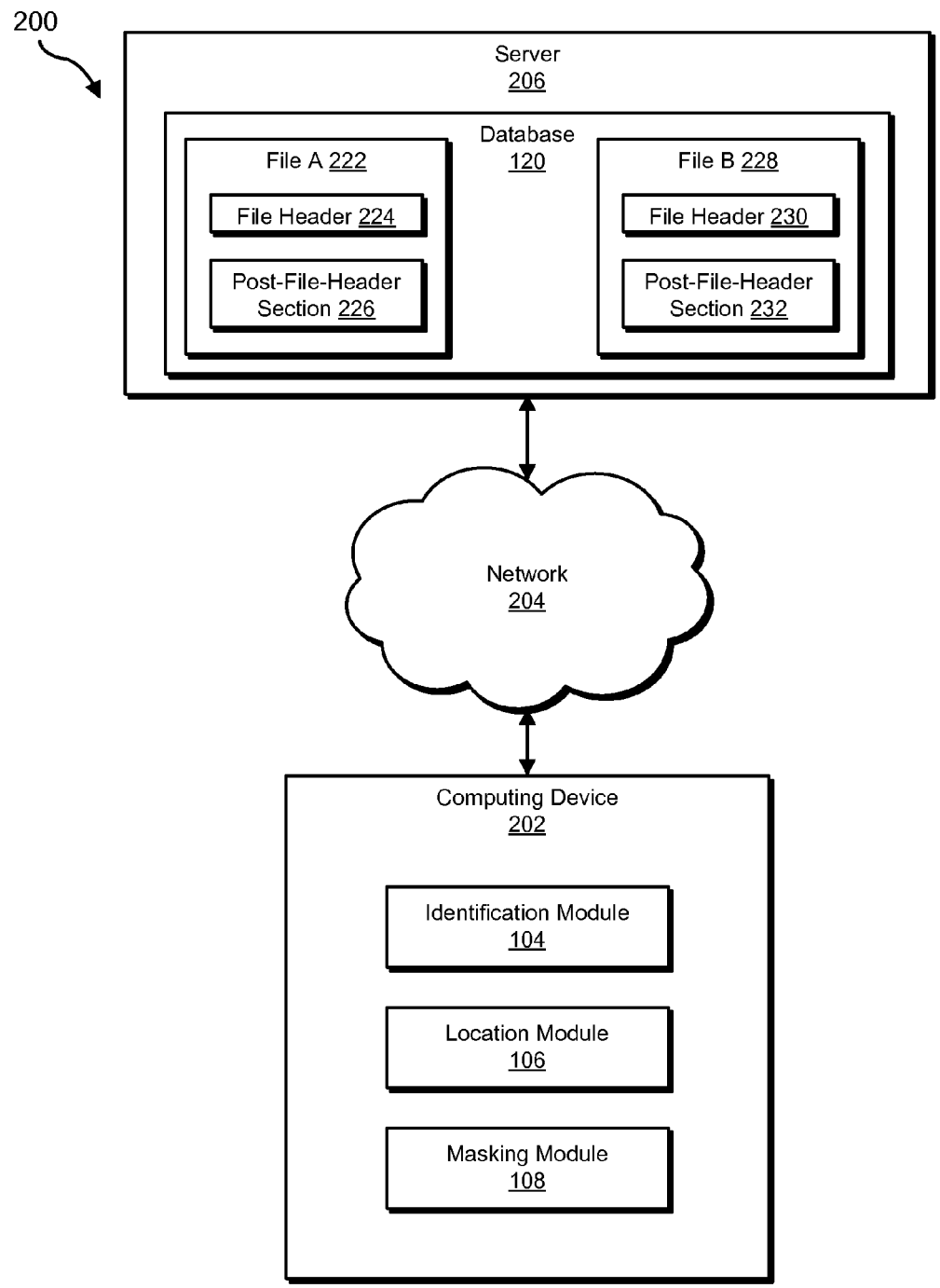
FIG. 2 is a block diagram of an exemplary system for automatically identifying changes in deliverable files.

The following will provide, with reference to FIGS. 1-2, detailed descriptions of exemplary systems for automatically identifying changes in deliverable files. Detailed descriptions of corresponding computer-implemented methods will also be provided in connection with FIG. 3. Detailed descriptions of a corresponding graphical user interface will be provided in connection with FIGS. 4 and 6. Moreover, detailed descriptions of an exemplary object file will be provided in connection with FIG. 5. In addition, detailed descriptions of an exemplary computing system and network architecture capable of implementing one or more of the embodiments described herein will be provided in connection with FIGS. 7 and 8, respectively.

FIG. 1 is a block diagram of exemplary system 100 for automatically identifying changes in deliverable files. As illustrated in this figure, exemplary system 100 may include one or more modules 102 for performing one or more tasks. For example, and as will be explained in greater detail below, exemplary system 100 may include an identification module 104 that may identify, within first and second versions of a program file, at least one post-file-header section that may be located after a file header of the program file. Exemplary system 100 may additionally include a location module 106 that may locate, within the post-file-header section of the first version of the program file, a first set of characters that correspond to at least one data field that may be known to potentially change between builds of the program file even when source code of the program file has not changed. Location module 106 may also locate, within the post-file-header second of the second version of the program file, a second set of characters that correspond to the data field that is known to potentially change between builds of the program file. Additionally, exemplary system 100 may further include a masking module 108 that may mask both the first and second sets of characters from a comparison between the first and second versions of the file by excluding the characters from consideration during the comparison. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store build files associated with different builds of a software package. The build files may include different versions of the same file that correspond to different builds. The files may include program files, object files, disassembly files, and files referenced by the program files, included within the program files, or included with corresponding software packages. The various files may be managed by a distributed version control and/or source code management system such as GIT.

Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, facilitate computing device 202 and/or server 206 in automatically identifying changes in deliverable files. For example, and as will be described in greater detail below, one or more of modules 102 may cause computing device 202 and/or server 206 to engage in automatically identifying changes in deliverable files. For example, identification module 104 may be programmed to identify, within first and second versions of a program file, at least one post-file-header section that is located after a file header of the program file. The first and second versions of the program file may correspond to file A 222 and file B 228 in FIG. 2. Each of file A 222 and file B 228 have a file header 224 and 230, respectively, and a post-file-header section 226 and 232, respectively. Location module 106 may be programmed to locate, within post-file-header section 226 of the first version of the program file, file A 222, a first set of characters that correspond to at least one data field that is known to potentially change between builds of the program file even when source code of the program file has not changed. Location module 106 may further be programmed to locate, within post-file-header section 232 of the second version of the program file, file B 228, a second set of characters that correspond to the data field that is known to potentially change between builds of the program file. Masking module 108 may be programmed to mask both the first and second sets of characters from a comparison between the first and second versions of the file by excluding the characters from consideration during the comparison.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 710 in FIG. 7, or any other suitable computing device.

Server 206 generally represents any type or form of computing device that is capable of storing files including program files. Server 206 may also generally manage a distributed version control or source code management system. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and server 206.

Figure 3:
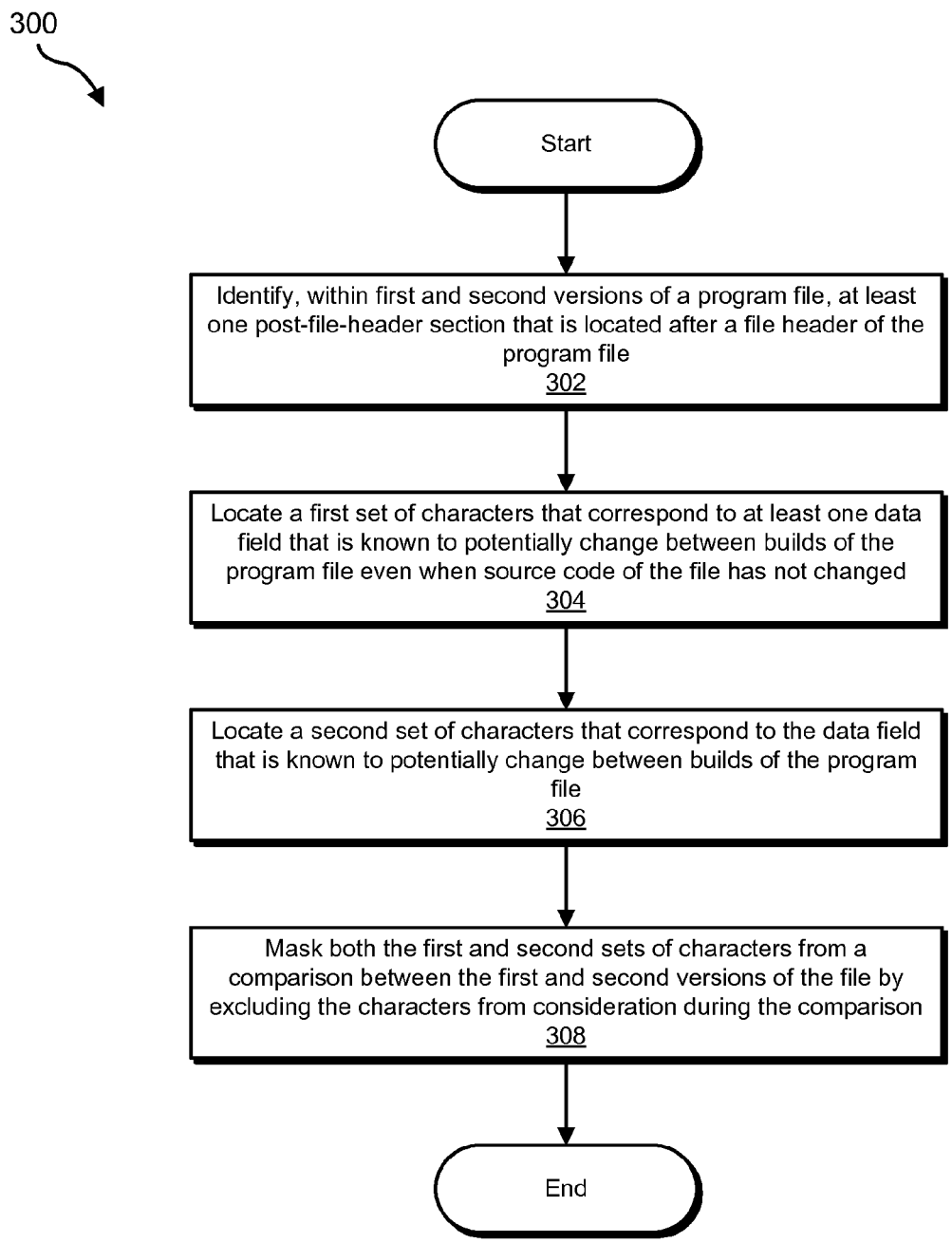
FIG. 3 is a flow diagram of an exemplary method for automatically identifying changes in deliverable files.

FIG. 3 is a flow diagram of an exemplary computer-implemented method 300 for automatically identifying changes in deliverable files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify, within first and second versions of a program file, at least one post-file-header section that is located after a file header of the program file. For example, at step 302 identification module 104 may, as part of computing device 202 in FIG. 2, identify, within first and second versions of a program file, at least one post-file-header section that is located after a file header of the program file.

As used herein, the term "post-file-header section" may refer to any file section that is located subsequent to a file header that functions as a header for the entire file. The post-file-header section may correspond to a section header (i.e., a header for a section instead of a header for the entire file). The post-file-header section may also correspond to a raw data section, as further discussed below.

The file header may take a variety of forms. In general, a file header may be located at the start of the file. A file header may include a non-optional portion and an optional portion, which may alternatively be omitted. The program file may include an object file, a disassembly file, or any file that includes machine code, assembly code, or disassembly code.

In at least one embodiment, the program file may include an object file in the COMMON OBJECT FILE FORMAT (COFF), which may be used by some UNIX-like systems and by MICROSOFT WINDOWS. Alternatively, the object file may have the EXECUTABLE AND LINKABLE (ELF) format. The structure of COFF and ELF files may be relevantly similar for the purposes of the systems and methods described herein. The program file may alternatively include an object file in the STABS or DWARF format.

Identification module 104 may identify the post-file-header section in a variety of ways. Identification module 104 may identify the post-file-header section in part by parsing the first version and/or the second version of the program file. Identification module 104 may parse the program file sequentially from the start of the file. In parsing the program file, identification module 104 may first identify the file header that begins the program file.

Figure 4:
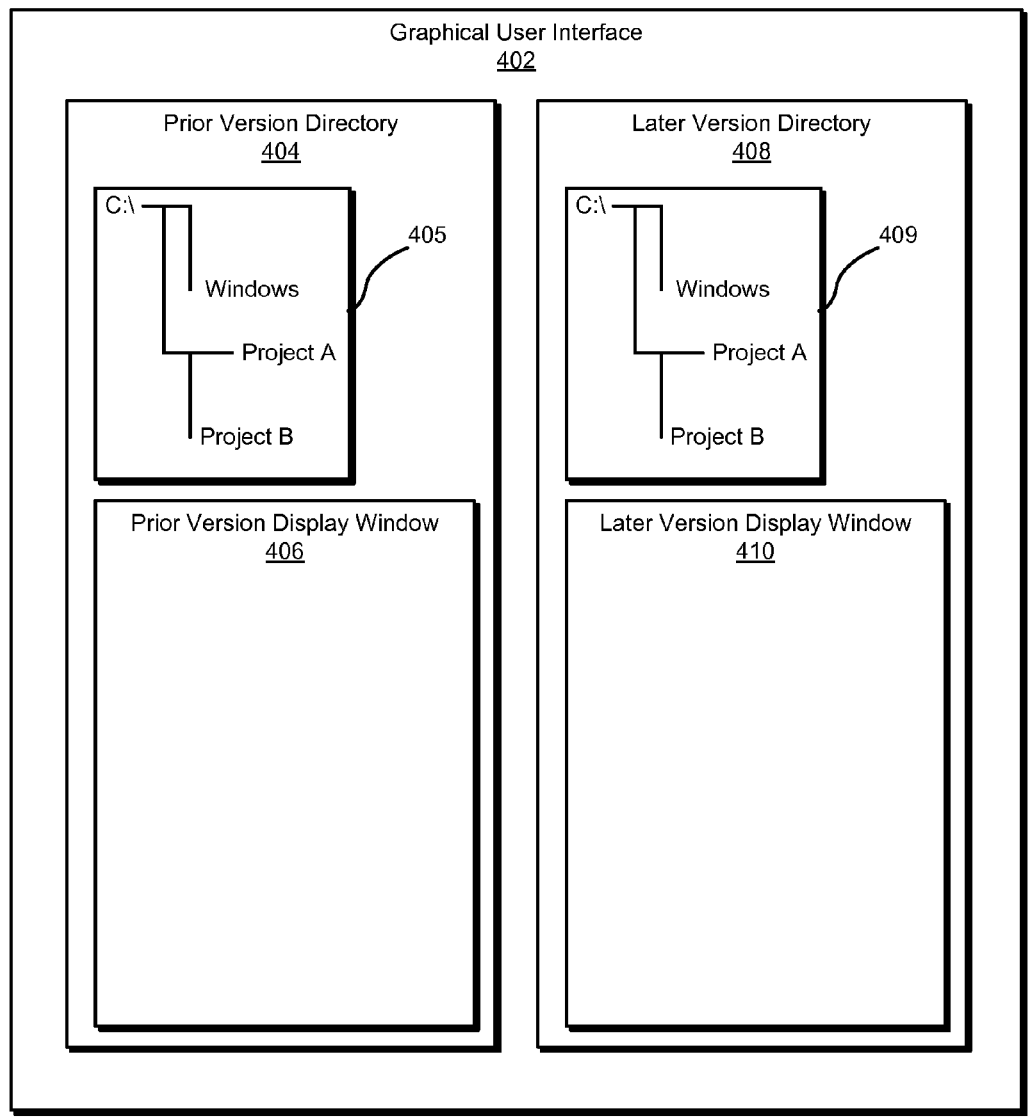
FIG. 4 is a block diagram of an exemplary graphical user interface for automatically identifying changes in deliverable files.

Identification module 104 may identify the post-file-header section as part of larger method for creating a list of different files (or a list of candidate different files). FIG. 4 shows an exemplary graphical user interface 402 that a developer may use to create a list of different files (e.g., files to be included within a patch or set of deliverables). A developer, or autonomous intelligent software, may identify a prior version directory 404 and a later version directory 408. In the example of FIG. 4, the prior version (i.e., prior build) may correspond to C:\Project A in a directory display 405, and the later version (i.e., later build) may correspond to C:\Project B in a directory display 409. Graphical user interface 402 may also include a prior version display window 406 and a later version display window 410, which may display further information about the two builds, including further information about the source tree, such as names and contents of files within the source tree directory and/or subdirectories.

As shown in FIG. 4, in some examples systems described herein may display both the first version of the program file and the second version of the program file adjacent to each other in a graphical user interface. By convention, file comparison programs may display earlier builds on the left and later builds on the right. But that particular orientation is not critical for the disclosed systems and methods, and graphical user interface 402 may display the two builds according to any suitable or arbitrary orientation. In one embodiment, a user and/or identification module 104 may identify (e.g., through graphical user interface 402) a fully built source tree, as opposed to identifying only the directory containing the executable file.

Having identified the first and second builds or source trees (e.g., using graphical user interface 402), identification module 104 may identify each file in the second, later build (i.e., on the right side of graphical user interface 402). For each file in the later build, identification module 104 may add the file to the list of different files if: (1) the file is not a valid object file (i.e., not a valid COFF file for builds using that file format), or (2) does not have a corresponding file in the first, prior build (i.e., indicating that the file is a newly created file). Identification module 104 may check whether both the path and file name are the same between builds to identify corresponding pairs of file versions.

Having identified the file header for the entire program file, identification module 104 may add the program file to the list of different files if: (3) a machine identifier within the file header does not match between the first and second versions of the file, (4) the number of symbols within the file header does not match between the first and second versions of the file, or (5) the characteristics (i.e., attribute flags) within the file header do not match between the first and second versions of the file. Any one of these triggers (1)-(5) may result in identification module 104 adding the program file to the list of different files (and identification module 104 may check all or any subset of them). Upon identifying any single trigger, identification module 104 may stop (e.g., stop parsing the file), because the program file is already identified as different, and so there may be no benefit to checking for further differences. In other words, for triggers (1)-(5), and for the various header section and raw data section triggers (or data fields) discussed below, the systems and methods described herein may also omit the checking of one or more triggers, depending on the level of accuracy or caution desired (i.e., masking module 108 may fail to mask any permutation of data fields, even though the data fields are known to potentially change even when underlying source code has not changed, in an abundance of caution). Any other suitable trigger may result in a program file being added to a list.

At step 304 one or more of the systems described herein may locate, within the post-file-header section of the first version of the program file, a first set of characters that correspond to at least one data field that is known to potentially change between builds of the program file even when source code of the program file has not changed. For example, at step 304 location module 106 may, as part of computing device 202 in FIG. 2, locate, within post-file-header section 226 of the first version of the program file, file A 222, a first set of characters that correspond to at least one data field that is known to potentially change between builds of the program file even when source code of the program file has not changed.

As used herein, the term "set of characters" refers to one or more of any suitable type or form of characters (e.g., bytes, text, etc.) that represent a single value. For example, the number "23" includes two characters, "2" and "3" that together represent the value 23. The various data fields described herein may specify various values, and specifying those values may require multiple characters or bytes. In other words, the term "set of characters" here may refer to one or more characters, in machine or low-level code, that represent a single value at a higher level of abstraction. More specifically, the "set of characters" may refer to nibbles or half-bytes (e.g., expressed in hexadecimal) that together represent a single value (e.g., the two characters "FF" represent the single value 255).

Location module 106 may locate the first set of characters in a variety of ways, as discussed further below. Identification module 104 may continue to parse the file (i.e., if identification module 104 has not yet found a difference) and then identify one or more section headers. Each section header may include metadata that indicates attributes about a subsequent raw data section later in the file that corresponds to the section header. Location module 106 may locate the first set of characters within one of the section headers.

Figure 5:
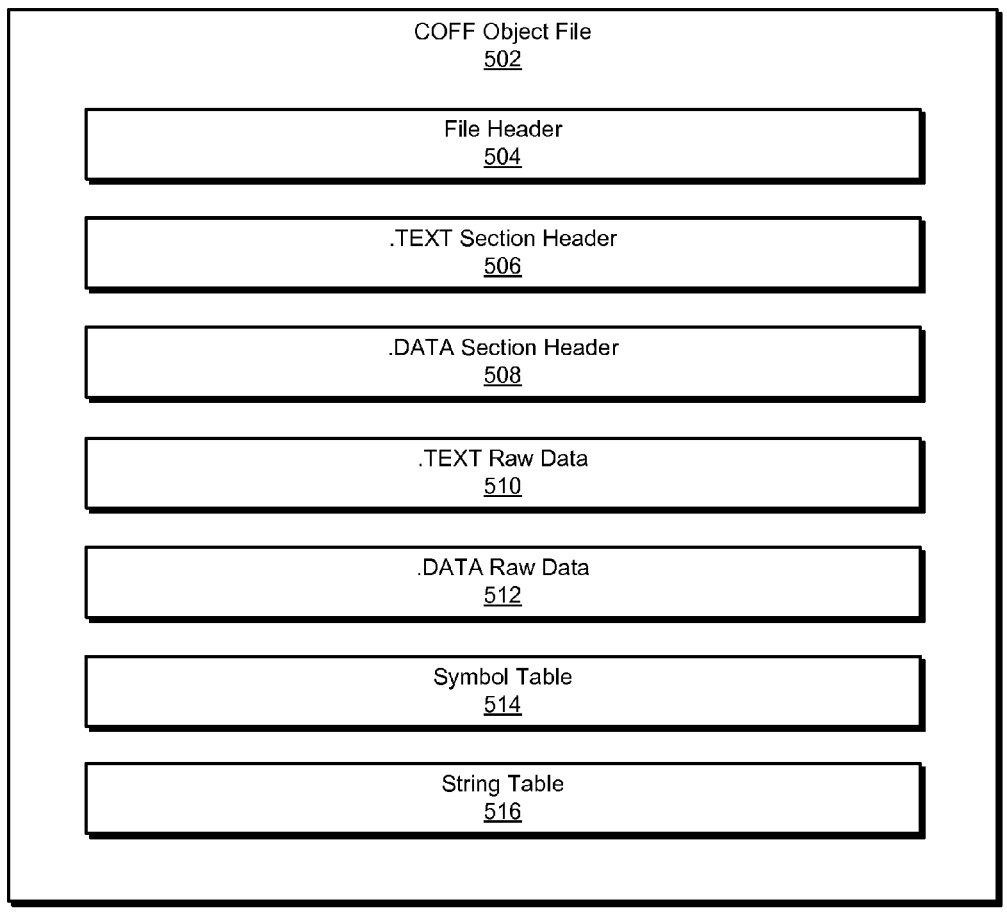
FIG. 5 is a block diagram of an exemplary object file used in systems and methods for automatically identifying changes in deliverable files.

FIG. 5 shows an exemplary COFF object file 502 in accordance with the systems and methods described herein. As shown in FIG. 5, COFF object file 502 may include the following portions in sequential order, from start to finish (with or without intervening bits): a file header 504, a .TEXT section header 506, a .DATA section header 508, a .TEXT raw data section 510, a .DATA raw data section 512, a symbols table 514, and a string table 516. In the example of FIG. 5, .TEXT section header 506 and .DATA section header 508 may correspond to .TEXT raw data section 510 and .DATA raw data section 512, respectively. Identification module 104 may identify a post-file-header section that constitutes a raw data section, such as .DATA raw data section 512, in part by identifying the corresponding header section (i.e., .DATA section header 508).

While parsing a section header, identification module 104 may add the program file to a list of different files if, within the section header: (1) the section name does not match between the first version and the second version of the program file, (2) the physical address does not match between the first version and the second version of the program file, (3) the virtual address does not match between the first version and the second version of the program file, (4) the pointer to line numbers does not match between the first version and the second version of the program file, (5) the number of relocations does not match between the first version and the second version of the program file, or (6) the number of line numbers does not match between the first version and the second version of the program file. Optionally, identification module 104 may also add the program file to a list of different files if: (7) .bss section characteristics do not match between the first version and the second version of the program file, (8) the flags subsection of the header section does not match between the first version and the second version of the program file, and/or (9) the memory page number of the header section does not match between the first version and the second version of the program file. Identification module 104 may also add the program file to a list of different files based on any other suitable trigger.

Moreover, location module 106 may locate characters (e.g., within the section header) that correspond to the following data fields that are known to potentially change between builds of the program file even when source code of the program file has not changed: (1) the size of the raw data, (2), the pointer to the raw data, and/or (3) the pointer to relocation information (e.g., COFF files may include relocation information for each section in respective relocation sections that are located subsequent to the raw data sections, and in the same order, as is known in the art). These data fields may change simply due to a difference in size between the first and second versions of the program files (e.g., because a build number changed and increased in number of characters, as discussed further below), even if the underlying source code did not change. Masking module 108 may later mask these data fields from the comparison to determine whether the later version of the program file should be included within a patch or set of deliverables (e.g., by simply skipping the fields during the parsing and step-by-step comparisons).

Having addressed section headers, the present application may also address data within raw data sections. Location module 106 may locate a first set of characters within a raw data section that correspond to at least one data field that is known to potentially change between builds of the program file even when source code of the program file has not changed. The data field may include any type or form data. For example, the data field may include at least one of: (1) a source file name that indicates a name of a source file corresponding to the program file, (2) a decorated name that was decorated to distinguish an entity that an undecorated version of the decorated name identifies from other entities having the same undecorated name, (3) a random number designating an anonymous namespace that limits applicability of the namespace to the program file, (4) a globally unique identifier, (5) a random number in a precompiled header name that identifies a precompiled header file that is compiled into intermediate form to increase compiling efficiency, and/or (6) a value within a symbol table that associates at least one identifier in the source code with metadata about the identifier.

Location module 106 may locate the first set of characters by (1) manual input (i.e., a developer manually or otherwise locates and/or inputs a data field value, such as a build number for the first and/or second version of the program file), (2) identifying the size of the first set of characters, (3) identifying a relative position of the first set of characters, and/or (4) using the content of the first set of characters. In other words, manual input, a size/position of the first set of characters, and/or a content of the characters may locate the characters or indicate that they correspond to a particular data field.

At step 306 one or more of the systems described herein may locate, within the post-file-header section of the second version of the program file, a second set of characters that correspond to the data field that is known to potentially change between builds of the program file. For example, at step 306 location module 106 may, as part of computing device 202 in FIG. 2, locate, within post-file-header section 232 of the second version of the program file, file B 228, a second set of characters that correspond to the data field that is known to potentially change between builds of the program file.

Location module 106 may generally locate the second set of characters in a manner analogous to locating the first set of characters, as described above. Location module 106 may also locate the second set of characters in part based on the previously located or identified first set of characters. Location module 106 may search for a similarity, correspondence, or relationship between the two sets of characters in terms of relative or absolute positioning and/or in terms of the content of the two sets of characters. In other words, locating the first set of characters may provide information about the content, size, and/or positioning of the second set of characters that location module 106 may use when locating the second set of characters (and vice versa, if location module 106 locates the second set of characters prior to locating the first set of characters).

At step 308 one or more of the systems described herein may mask both the first and second sets of characters from a comparison between the first and second versions of the file by excluding the characters from consideration during the comparison. For example, at step 308 masking module 108 may, as part of computing device 202 in FIG. 2, mask both the first and second sets of characters from a comparison between the first and second versions of the file by excluding the characters from consideration during the comparison.

Masking module 108 may mask the characters in a variety of manners. In general, masking module 108 may simply skip, or mark for skipping, the located sets of characters. Masking module 108 may skip the located sets of characters during a step-by-step comparison of the various data fields in the first and second versions of the program file, as discussed above. Masking module 108 may also remove the first and second set of characters from the first and second versions of the program file or from portions and/or copies of the first and second versions held in primary, volatile, auxiliary, and/or persistent memory to perform the comparison. Upon removing the first and second set of characters, the systems and methods described herein may perform a comparison (e.g., a binary comparison) of the remainder of the first and second versions of the program file (e.g., upon removing all characters corresponding to all data fields in the first and second versions that are known to potentially change and/or desired or designated to be removed). Alternatively, upon removing the first and second set of characters, masking module 108 may resume a step-by-step comparison of the two versions of the program file that sequentially either compares or skips the previously identified different data fields (i.e., one at a time, or multiples at a time) within the program file.

In one embodiment, masking module 108 may, prior to masking both the first and second sets of characters, verify that the first set of characters is located within the first version of the program file at a same offset as the second set of characters is located within the second version of the program file. For example, in one embodiment, the data field may designate a first build number in the first version of the program file and a later build number in the second version of the program file. Masking module 108 may verify that the first and later build numbers are located at the same offset within the file.

Figure 6:
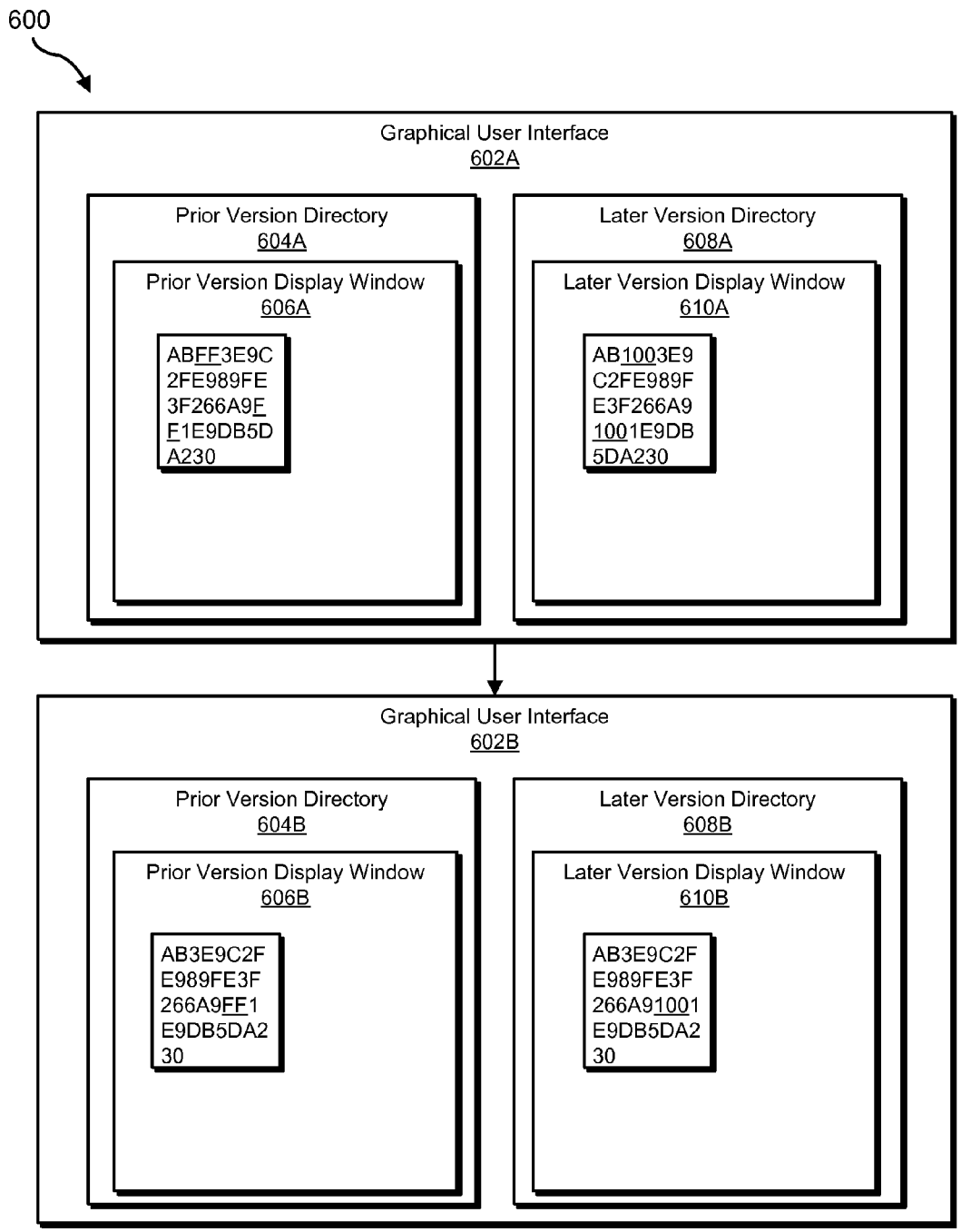
FIG. 6 is a block diagram of an exemplary pair of graphical user interfaces for automatically identifying changes in deliverable files.

FIG. 6 shows an exemplary pair of graphical user interfaces 602A and 602B, which may correspond to graphical user interface 402. Graphical user interface 602A may indicate an arrangement of data within the program file prior to removal of a build number, and graphical user interface 602B may indicate an arrangement of data within the program file after removal, as discussed further below. Likewise, a prior version directory 604A, a later version directory 608A, a prior version display window 606A, a later version display window 610A, a prior version directory 604B, a later version directory 608B, a prior version display window 606B, and a later version display window 610B, may all correspond to similar elements in FIG. 4 with parallel numbering (where "A" and "B" indicate a state before, and after, removal of a build number, respectively).

In some embodiments, (1) the first version of the program file contains, in the post-file-header section, a subsequent instance of the first build number, (2) the second version of the program file contains, in the post-file-header section, a subsequent instance of the later build number, and (3) the subsequent instance of the first build number is located at an offset in the first version that is different than an offset where the subsequent instance of the later build number is located in the second version. As shown in FIG. 6, the beginning of the post-file-header section in the first version of the program file shown in prior version display window 606A may include two different instances of a build number "FF" (underlined), a first instance and a subsequent instance. Likewise, the post-file-header section in the second version of the program file shown in later version display window 610A may include two different instances of a corresponding build number "100" (underlined), a first instance and a subsequent instance. Notably, build number "100" may indicate a single increment increase, in hexadecimal, from build number "FF" (i.e., an increase in build number from 255 to 256).

Prior to masking or removal of the first instance of the build numbers "FF" and "100," the second instance of the build number may be located at a different offset in the first version of the program file than in the second version of the program file. In the example of FIG. 6, the second instance of build number "FF" in prior version display Window 606A is located after 23 characters from the first character "A" (i.e., after characters "ABFF3E9C2FE989FE3F266A9"). In contrast, the second instance of build number "100" in later version display window 610A is located after 24 characters from the first character "A" (i.e., after characters "AB1003E9C2FE989FE3F266A9"). The different offset is due to the single increase in character length between the build numbers FF and 100. More generally, because the two build numbers may have different numbers of characters, the larger build number may push the second instance of the build number to a different offset than the second instance having the smaller number of characters.

Masking module 108 may shift the subsequent instance of the first build number and the subsequent instance of the later build number so that the subsequent instance of the first build number and the subsequent instance of the later build number are located at the same offset. For example, masking module 108 may remove the first instance of build number FF in prior version display window 606B and may remove the first instance of build number 100 in later version display window 610B. Masking module 108 may remove the build numbers from the original versions of the program files or copies of all or part of the versions stored in volatile or persistent memory.

Upon removal, the remaining subsequent instances of build numbers may be located at a same offset. As shown in graphical user interface 602B, the second instance of the build number FF in prior version display window 606B is located at the same offset as the second instance of the build number 100 in later version display window 610B. Both subsequent instances of the build number are located after the same sequence of characters: "AB3E9C2FE989FE3F266A9." Upon removing the first instances of the build numbers, masking module 108 may then confirm that the subsequent instances are located at the same offset. Masking module 108 may require data fields to be located at the same offset to be masked or excluded from the comparison of the two versions of the program file. Masking module 108 may repeat the process of removing instances of data fields and checking whether subsequent instances are located at a same offset until all remaining data fields of interest (e.g., all instances of build numbers) are analyzed and/or removed from the raw data section.

Upon parsing or analyzing the entire program file or all remaining data fields of interest, masking module 108 may determine, based on the comparison between the first version and the second version, whether to include the second version of the program file in a patch. Specifically, different versions of files that still contain some difference, despite the masking of data fields (as described above), may correspond to updated files that should be included within a patch and/or set of deliverable files. Masking module 108 may repeat this process for all object files in the source tree. For example, masking module 108 (and/or identification module 104) may (1) search a directory that contains the first build and another directory that contains the later build for all pairs of object files in the directory and the other directory, where each pair contains a first version of the object file and a second version of the object file, and (2) for each pair of object files in the directory and the other directory, determine whether to include the second version of the object file in the patch, as described above.

In some examples, masking module 108 may determine whether to include the second version of the program file in the patch in part by: (1) identifying at least one of an executable file and a dynamic link library file that contains the program file, and/or (2) including the executable file and/or the dynamic link library file in the patch. For example, masking module 108 may examine debug (e.g., .PDB) files within the source tree and/or software package. The debug files may map object or assembly files to executable and/or library files. Masking module 108 may use the debug file(s) to identify all executables and/or library files that include the object files that are identified as changed despite the masking of data fields, as outlined above. Masking module 108 may include all of those executable and/or library files in the patch or set of deliverable files.

Masking module 108 may also begin with managed code deliverables, instead of with original object files. Masking module 108 may generate a list of all managed code deliverables. Masking module 108 may then disassemble the managed code deliverables (e.g., using a disassembler such as ILDASM.EXE). The disassembly process may produce a disassembly file for the code, as well as potentially other files, such as image files, HTML files, XML files, resource files, and other file types. Masking module 108 may determine whether each of the produced files can be parsed. Masking module 108 may handle files that can be parsed the same as for object files (i.e., parsed in a manner that identifies a data field that is known or expected to change even when underlying source code does not change), as described above. Specifically, masking module 108 may perform a comparison between different versions of the disassembly file while masking one or more data fields, in a manner that parallels the masking for the underlying object files. If a file, such as an image file, cannot be parsed in a manner that enables masking of the data fields outlined above, then masking module 108 may perform a straight binary comparison.

Moreover, in one embodiment, masking module 108 may: (1) prior to masking both the first and second sets of characters, perform a binary comparison between data within the post-file-header section of the first version of the program file and data within the post-file-header section of the second version of the program file, and (2) determine, based on the binary comparison, that the data within the post-file-header section differs between the first build and the later build. In contrast, if the binary comparison shows that the two versions of the program file are bit-for-bit identical, then masking module 108 may assume that no relevant changes occurred to the file (i.e., not even changes in build number or other expected changes), and may therefore omit the later version of the program file from the patch.

This concludes the discussion of FIG. 3. The following provides an overview of the systems and methods described herein from a higher level perspective. The systems and methods may determine if differences between deliverable files are actual code changes that should be included in a post-release software patch. The systems and methods may eliminate differences that are simply due to a build number change or other expected build to build changes.

Determining what deliverable files have changed from build to build has been a manual process that was error prone. Often developers did not know how to determine what files should be included in a post-release fix or they would not realize that one or more additional files were desired. MICROSOFT'S BINDIFF.EXE utility would show that object files were different between builds even when no code changes affected those object files.

The systems and methods herein may solve the problem by examining the object files or disassembly files that make up the deliverable, excluding the code and/or data that is known to be different between builds even when there are no actual source code changes, and then comparing the remaining data to see what is left.

The process may be given input of two directories to compare. The input may also include the build numbers of each side (left and right) of the comparison. For deliverables on WINDOWS systems the object (.obj) files may be examined and compared. The left and right side directories may be searched for all object files. Matching object files (e.g., by path and name) may be opened and items in the header that are expected to be the same may be compared. The comparison may then iterate through the sections in the object files. Items in each section header that are expected to be the same may be compared and then the data for each section (i.e., data in a post-file-header section) may be compared. If the data does not immediately match then the data may be examined more closely to see if items expected or known to be different can be ignored. These items may include 1) a section whose data is the file name of a source file that the object file was built from, 2) decorated names (the names may be undecorated or unmangled and then compared), 3) random numbers due to anonymous namespaces, 4) the build numbers in ASCII form, UTF-16 form, and numerical form, 5) a specific section type and length that is known to be a generated globally unique identifier, and 6) a random number in a precompiled header name.

When the above checks are performed the differences that are found may be required to be located at the same offset in the data to be ignored. Note that build numbers can be sufficiently different that they consume a different number of bytes between the left and right sides and there may be more than one occurrence of build numbers in a single section's data. Once a pair of build numbers is removed then the next pair of build numbers may be required to be located at the same offset in the modified data. This may happen in a loop until no more build number pairs are found. Additionally, the symbol table may be ignored. If there is a difference in the symbol table that would require the object file to be flagged as different then there should be a data section that is different that will cause the same result.

After a list of object files that contain real differences is generated then the debug (.pdb) files may be examined. There may be one .pdb file per executable (.exe) or dynamic link library (.dll) file in the product. The .pdb file may contain a list of what object files are contained in each .exe and .dll file. The systems and methods may retrieve this information and generate a list of object files that each point to a list of what .exe and .dll files they are contained within. The systems and methods may then iterate through the list of different object files and generate a list of .exe and .dll files for consumption by the patch generation process.

The above discussion explained how the systems and methods may handle native code deliverables. The systems and methods may handle managed code deliverables in a different manner, as follows: 1) generate a list of all managed code deliverables, 2) disassemble the managed code deliverables using ILDASM.EXE (this produces at least a disassembly file for the code but can also produce other files that are embedded in the deliverable, and these may include image files, HTML files, XML files, resource files, and other file types), 3) compare the disassembly files and the other files. For files that can be parsed, mask build numbers, generated Globally Unique Identifiers (GUIDs), and the data fields in the same manner as for native code deliverables. For files that cannot be parsed, the systems and methods may perform a straight binary comparison. If a managed code deliverable's disassembled files are found to have a difference then the systems and methods may add that managed code deliverable to the list of files that should to be included in a patch.

As described above, the systems and methods described herein may enable developers to quickly and automatically compare different versions of files to identify updated files for inclusion in a patch. The systems and methods may perform the comparison by masking data fields that are known to change even when underlying source code has not changed.

Figure 7:
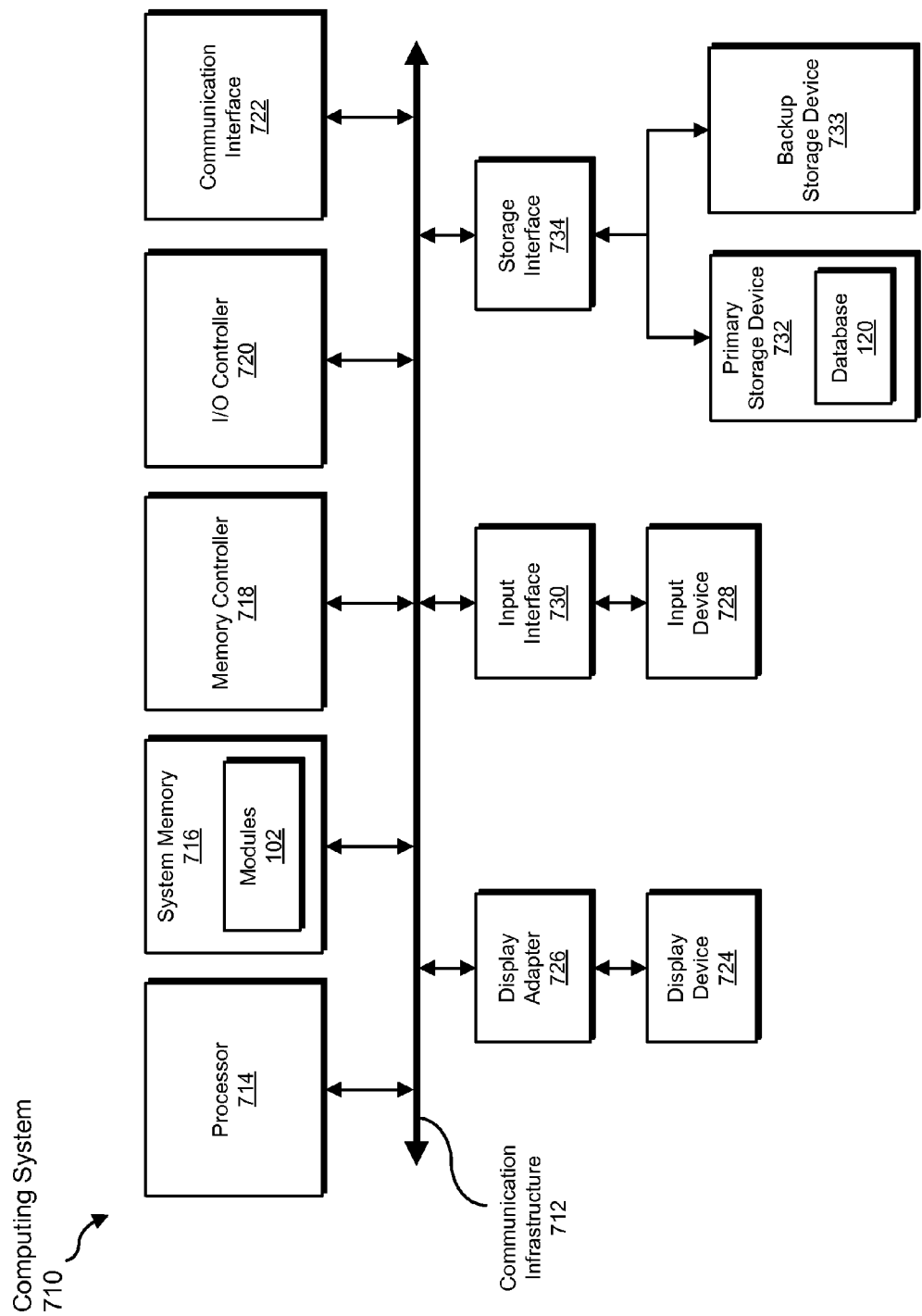
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid-state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
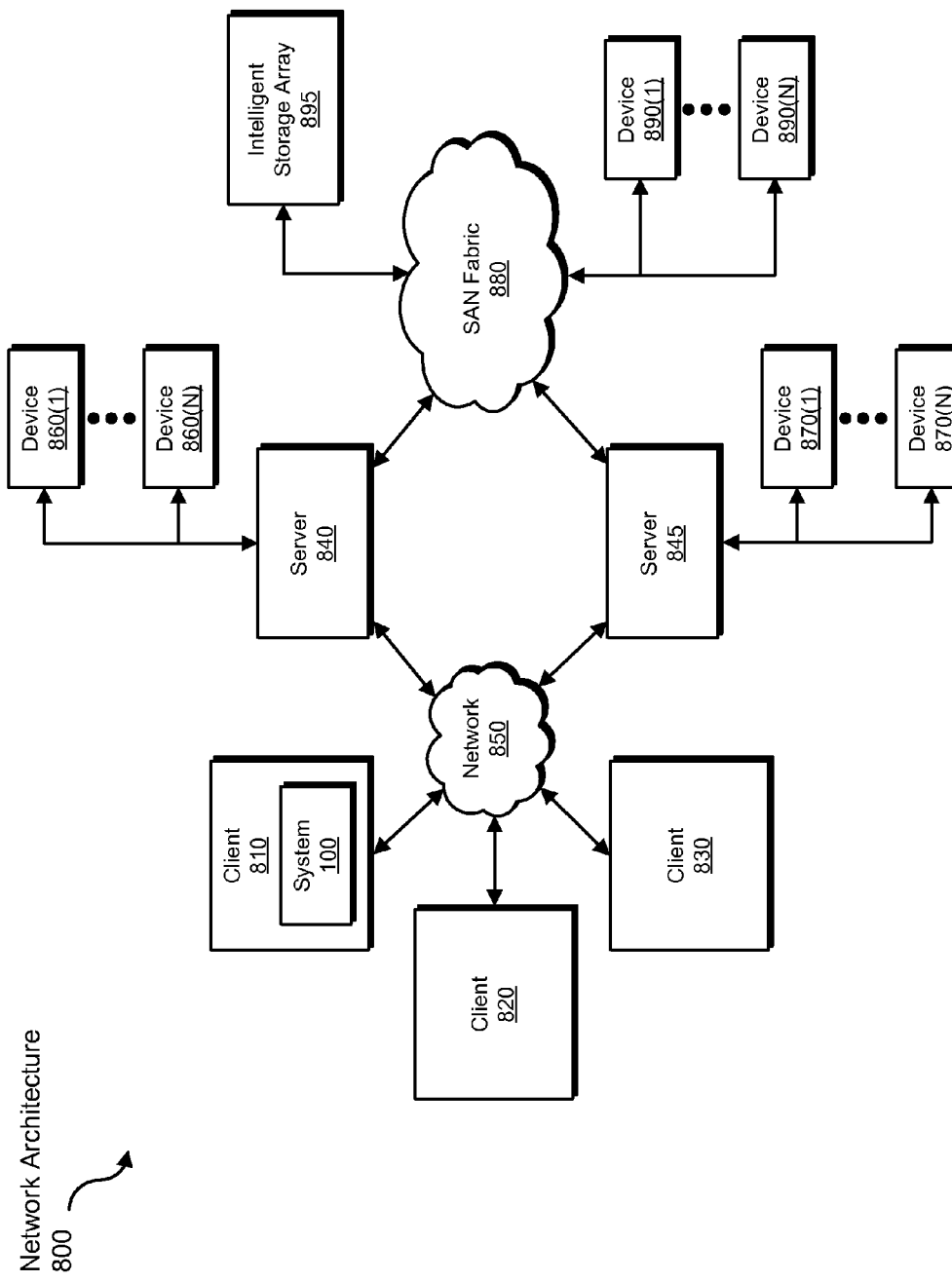
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally-attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for automatically identifying changes in deliverable files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive different versions of a file and/or a request for a file comparison, transform the versions, the request, and/or a processor state of a computing device while performing the comparison, output a result of the transformation as a result of the comparison, use the result of the transformation to determine which files to add to a set of deliverables, and store the result of the transformation to memory or a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for automatically identifying changes in deliverable files, at least a portion of the method being performed by a computing device comprising at least one processor, the method comprising:
   identifying, within first and second versions of a program file, at least one post-file-header section that is located after a file header of the program file;
   locating, within the post-file-header section of the first version of the program file, a first set of characters that correspond to at least one data field that is known to potentially change between builds of the program file even when source code of the program file has not changed, the data field designating a first build number in the first version of the program file and a later build number in the second version of the program file;
   locating, within the post-file-header section of the second version of the program file, a second set of characters that correspond to the data field that is known to potentially change between builds of the program file;
   masking both the first and second sets of characters from a comparison between the first and second versions of the program file by excluding the characters from consideration during the comparison at least in part by shifting a subsequent instance of the first build number by a length of the first set of characters within the first version of the program file and a subsequent instance of the later build number within the second version of the program file by a length of the second set of characters, the first build number and the later build number having different lengths such that the subsequent instance of the first build number and the subsequent instance of the later build number are shifted, in a direction toward a start of traversing the program file, from a different offset to a same offset.

2. The computer-implemented method of claim 1, further comprising masking an additional data field from the comparison, the additional data field comprising at least one of:
   a source file name that indicates a name of a source file corresponding to the program file;
   a decorated name that was decorated to distinguish an entity that an undecorated version of the decorated name identifies from other entities having the same undecorated name;
   a random number designating an anonymous namespace that limits applicability of the namespace to the program file;
   a globally unique identifier;
   a random number in a precompiled header name that identifies a precompiled header file that is compiled into intermediate form to increase compiling efficiency;
   a value within a symbol table that associates at least one identifier in the source code with metadata about the identifier.

3. The computer-implemented method of claim 2, wherein the additional data field comprises the globally unique identifier.

4. The computer-implemented method of claim 2, wherein the additional data field comprises the source file name that indicates the name of the source file corresponding to the program file.

5. The computer-implemented method of claim 2, wherein the additional data field comprises the random number in the precompiled header name that identifies the precompiled header file that is compiled into intermediate form to increase compiling efficiency.

6. The computer-implemented method of claim 1, further comprising displaying both the first version of the program file and the second version of the program file adjacent to each other in a graphical user interface.

7. The computer-implemented method of claim 1, further comprising determining, based on the comparison between the first version of the program file and the second version of the program file, whether to include the second version of the program file in a patch.

8. The computer-implemented method of claim 7, further comprising:
   searching a directory that contains the first version of the program file and another directory that contains the second version of the program file for all pairs of object files in the directory and the other directory, where each pair contains a first version of the object file and a later version of the object file;
   for each pair of object files in the directory and the other directory, determining whether to include the later version of the object file in the patch.

9. The computer-implemented method of claim 7, wherein determining whether to include the second version of the program file in the patch comprises:
   identifying at least one of an executable file and a dynamic link library file that corresponds to the program file;
   including the at least one of the executable file and the dynamic link library file in the patch.

10. The computer-implemented method of claim 1, further comprising:
   prior to masking both the first and second sets of characters, performing a binary comparison between data within the post-file-header section of the first version of the program file and data within the post-file-header section of the second version of the program file;

determining, based on the binary comparison, that the data within the post-file-header section differs between the first version of the program file and the second version of the program file.

11. A system for automatically identifying changes in deliverable files, the system comprising:

an identification module, stored in memory, that identifies, within first and second versions of a program file, at least one post-file-header section that is located after a file header of the program file;

a location module, stored in memory, that:

locates, within the post-file-header section of the first version of the program file, a first set of characters that correspond to at least one data field that is known to potentially change between builds of the program file even when source code of the program file has not changed, the data field designating a first build number in the first version of the program file and a later build number in the second version of the program file;

locates, within the post-file-header section of the second version of the program file, a second set of characters that correspond to the data field that is known to potentially change between builds of the program file;

a masking module, stored in memory, that masks both the first and second sets of characters from a comparison between the first and second versions of the program file by excluding the characters from consideration during the comparison at least in part by shifting a subsequent instance of the first build number by a length of the first set of characters within the first version of the program file and a subsequent instance of the later build number within the second version of the program file by a length of the second set of characters, the first build number and the later build number having different lengths such that the subsequent instance of the first build number and the subsequent instance of the later build number are shifted, in a direction toward a start of traversing the program file, from a different offset to a same offset;

at least one processor configured to execute the identification module, the location module, and the masking module.

12. The system of claim 11, wherein the masking module further masks an additional data field from the comparison, the additional data field comprising at least one of:

a source file name that indicates a name of a source file corresponding to the program file;

a decorated name that was decorated to distinguish an entity that an undecorated version of the decorated name identifies from other entities having the same undecorated name;

a random number designating an anonymous namespace that limits applicability of the namespace to the program file;

a globally unique identifier;

a random number in a precompiled header name that identifies a precompiled header file that is compiled into intermediate form to increase compiling efficiency;

a value within a symbol table that associates at least one identifier in the source code with metadata about the identifier.

13. The system of claim 12, wherein the additional data field comprises the globally unique identifier.

14. The system of claim 12, wherein the additional data field comprises the source file name that indicates the name of the source file corresponding to the program file.

15. The system of claim 12, wherein the additional data field comprises the random number in the precompiled header name that identifies the precompiled header file that is compiled into intermediate form to increase compiling efficiency.

16. The system of claim 11, wherein the identification module displays both the first version of the program file and the second version of the program file adjacent to each other in a graphical user interface.

17. The system of claim 11, wherein the masking module determines, based on the comparison between the first version of the program file and the second version of the program file, whether to include the second version of the program file in a patch.

18. The system of claim 17, wherein:

the masking module searches a directory that contains the first version of the program file and another directory that contains the second version of the program file for all pairs of object files in the directory and the other directory, where each pair contains a first version of the object file and a later version of the object file;

for each pair of object files in the directory and the other directory, the masking module determines whether to include the later version of the object file in the patch.

19. The system of claim 17, wherein the masking module determines whether to include the second version of the program file in the patch in part by:

identifying at least one of an executable file and a dynamic link library file that corresponds to the program file;

including the at least one of the executable file and the dynamic link library file in the patch.

20. A non-transitory computer-readable-storage medium comprising one or more computer-readable instructions that, when executed by at least one processor of a computing device, cause the computing device to:

identify, within first and second versions of a program file, at least one post-file-header section that is located after a file header of the program file;

locate, within the post-file-header section of the first version of the program file, a first set of characters that correspond to at least one data field that is known to potentially change between builds of the program file even when source code of the program file has not changed, the data field designating a first build number in the first version of the program file and a later build number in the second version of the program file;

locate, within the post-file-header section of the second version of the program file, a second set of characters that correspond to the data field that is known to potentially change between builds of the program file;

mask both the first and second sets of characters from a comparison between the first and second versions of the program file by excluding the characters from consideration during the comparison at least in part by shifting a subsequent instance of the first build number by a length of the first set of characters within the first version of the program file and a subsequent instance of the later build number within the second version of the program file by a length of the second set of characters, the first build number and the later build number having different lengths such that the subsequent instance of the first build number and the subsequent instance of the later build number are shifted, in a direction toward a start of traversing the program file, from a different offset to a same offset.

* * * * *